Figure 1:
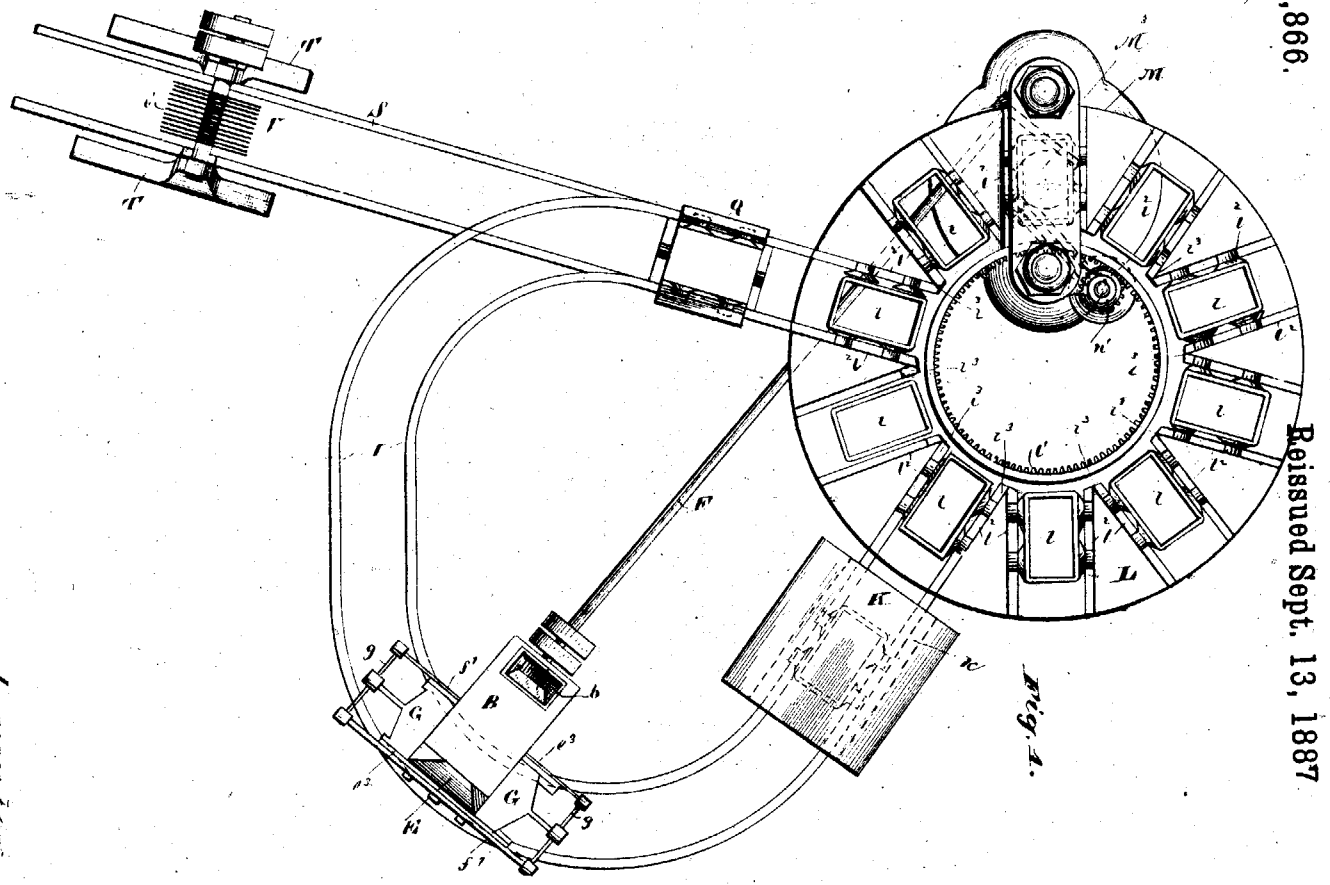

8 Sheets—Sheet 1.

J. T. LISTER.

Assignor of one-fourth to MRS. E. L. STURTEVANT.

APPARATUS FOR MAKING CARBONS.

No. 10,866. Reissued Sept. 13, 1887

Witnesses.
Wm. M. Monroe.
M. L. Comber

Inventor
John T. Lister
by
J. G. Fisher
Attorney.

8 Sheets—Sheet 2.
J. T. LISTER.
Assignor of one-fourth to MRS. E. L. STURTEVANT.
APPARATUS FOR MAKING CARBONS.
No. 10,866. Reissued Sept. 13, 1887.
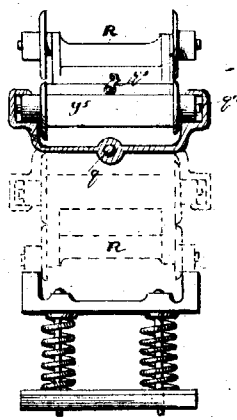
Fig. 15.
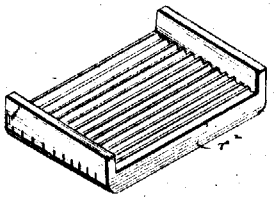
Fig. 16.
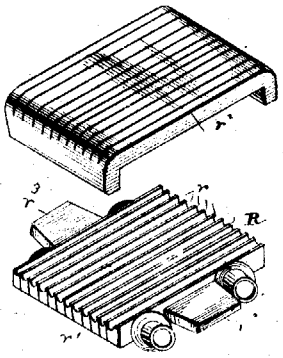
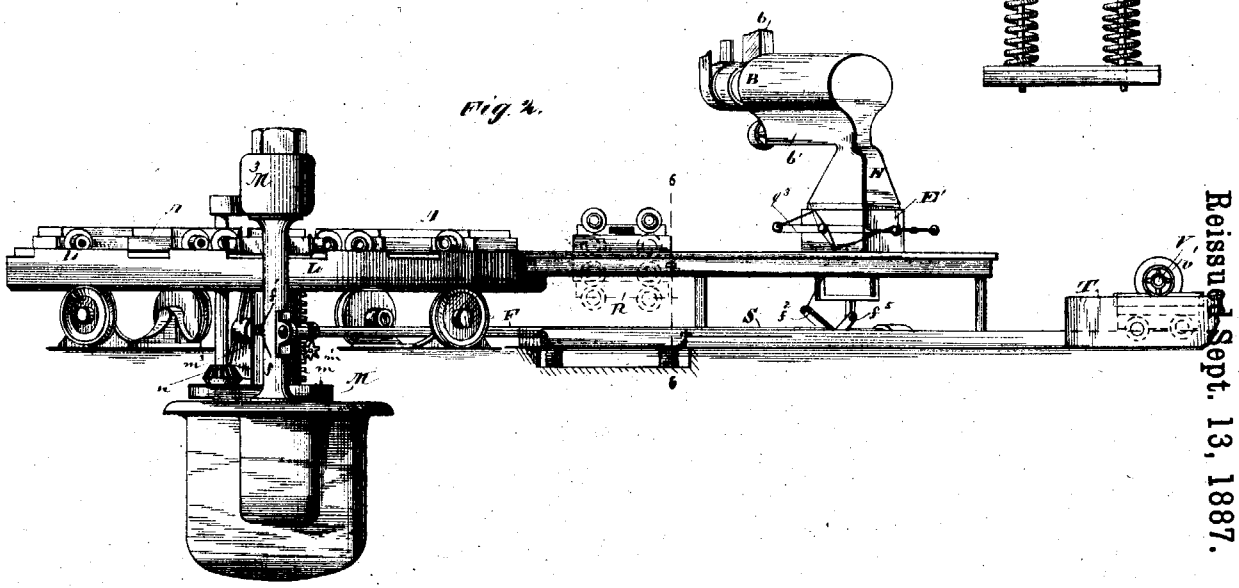
Fig. 14.
WITNESSES
Jno. W. Monroe,
M. L. Coombs
INVENTOR
John T. Lister
by H. J. Fisher,
ATTORNEY

J. T. LISTER.

Assignor of one-fourth to MRS. E. L. STURTEVANT.

APPARATUS FOR MAKING CARBONS.

No. 10,866. Reissued Sept. 13, 1887.

Witnesses.
Wm. M. Connor
M. L. Comber

Inventor
John T. Lister
by
H. T. Fisher
Attorney.

J. T. LISTER.

Assignor of one-fourth to MRS. E. L. STURTEVANT.

APPARATUS FOR MAKING CARBONS.

No. 10,866. Reissued Sept. 13, 1887.

Witnesses
Wm. H. Moore.
M. L. Combs

Inventor
John T. Lister
by
H. S. Fisher
Attorney.

J. T. LISTER.

Assignor of one-fourth to MRS. E. L. STURTEVANT.

APPARATUS FOR MAKING CARBONS.

No. 10,866. Reissued Sept. 13, 1887.

Witnesses.
Wm M Howard
M. L. Coombs

Inventor
John T. Lister
by
H. T. Fisher
Attorney

J. T. LISTER.
Assignor of one-fourth to MRS. E. L. STURTEVANT.
APPARATUS FOR MAKING CARBONS.
No. 10,866. Reissued Sept. 13, 1887.
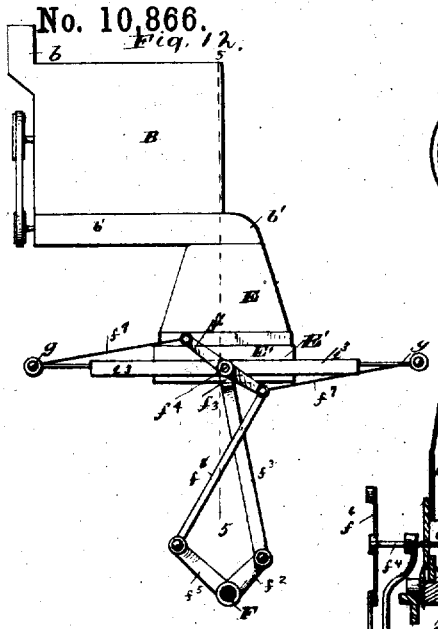
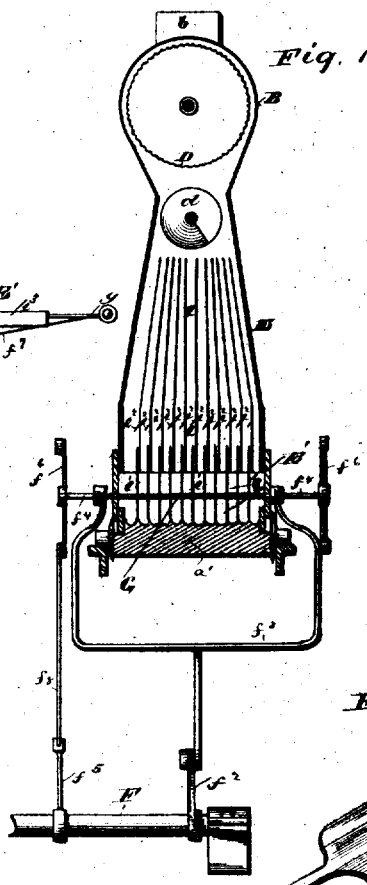
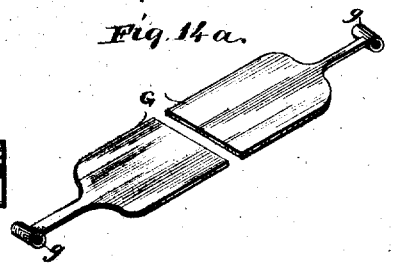
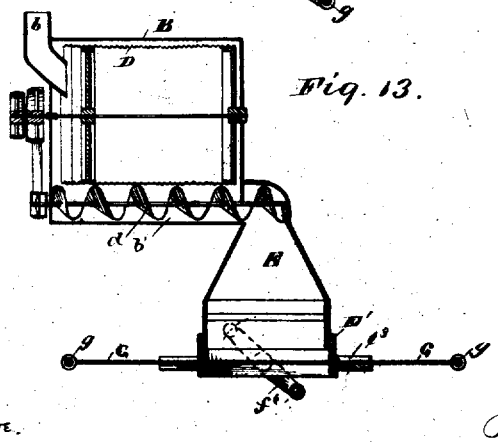
WITNESSES
Wm. M. Morse.
M. L. Combs
INVENTOR
John T. Lister
by
Jr. T. Fisher
Attorney.

8 Sheets—Sheet 7.

J. T. LISTER.

Assignor of one-fourth to MRS. E. L. STURTEVANT.

APPARATUS FOR MAKING CARBONS.

No. 10,866. Reissued Sept. 13, 1887.

Witnesses:

W. H. Thomas

M. L. Crombie

Inventor

John T. Lister by

H. T. Fisher

Attorney

J. T. LISTER.
Assignor of one-fourth to MRS. E. L. STURTEVANT.
APPARATUS FOR MAKING CARBONS.
No. 10,866. Reissued Sept. 13, 1887.
Fig. 20.
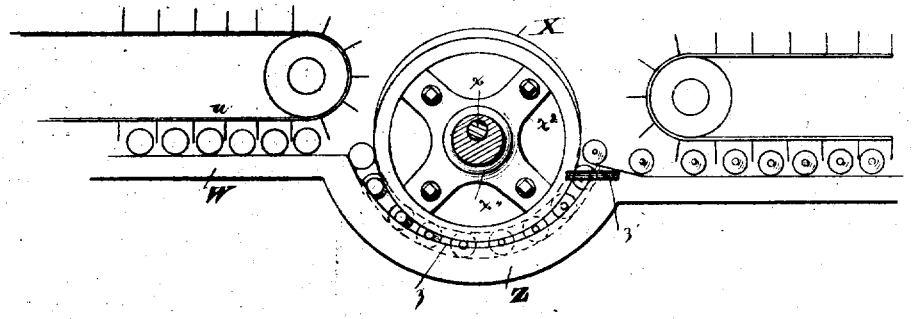
Fig. 21.
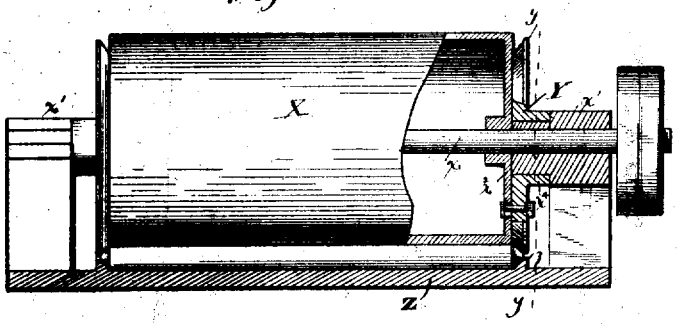
Fig. 23.
Fig. 22.
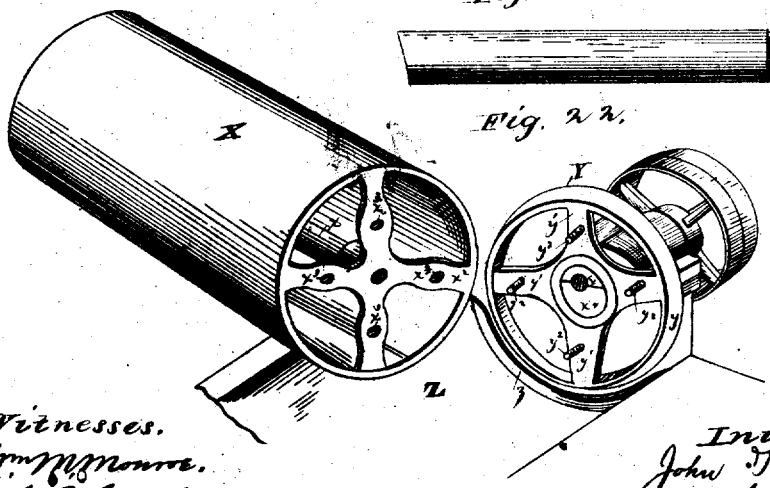
Witnesses.
Wm. H. Monroe.
M. L. Coombs
Inventor
John T. Lister
by
A. J. Fisher
Attorney

UNITED STATES PATENT OFFICE.

JOHN T. LISTER, OF CLEVELAND, OHIO, ASSIGNOR OF ONE-FOURTH TO MRS. E. L. STURTEVANT, OF SAME PLACE.

APPARATUS FOR MAKING CARBONS.

SPECIFICATION forming part of Reissued Letters Patent No. 10,866, dated September 13, 1887.

Original No. 347,247, dated August 10, 1886. Application for reissue filed May 31, 1887. Serial No. 239,894.

*To all whom it may concern:*

Be it known that I, JOHN T. LISTER, a citizen of the United States, residing at Cleveland, in the county of Cuyahoga and State of Ohio, have invented certain new and useful Improvements in Apparatus for Making Carbons; and I do hereby declare that the following is a full, clear, and exact description of the invention, which will enable others skilled in the art to which it appertains to make and use the same.

My invention relates to improvements in the art of manufacturing carbons.

The ordinary process of making carbons is as follows: The composition being properly prepared by grinding and mixing the ingredients, the person known as the "molder" weighs it out on scales according to the size of the carbon to be produced. From the scales the material, or "dust," as it is usually termed, is poured into the mold, which, meantime, has been heated sufficiently in a furnace to melt the pitch contained in the dust and produce an agglutinated mass of proper consistency to be molded into the desired form and solidity. The mold is then placed in the hydraulic press and subjected to a pressure of from three to five hundred tons, after which it is removed from the press and the carbons taken from the mold and laid away to cool. The cooling required at this stage of the proceedings is such as will make the carbons firm enough to bear handling without sustaining injury. In the process of molding, a web unavoidably forms between the carbons of such weight and strength that all the carbons in that series or impression are held firmly together. Before anything further can be done it is necessary to break these webs and reduce the carbons to separate pieces. This is done by striking the webs, one after another, with a metal plate or knife. The division of the carbons being accomplished, the seams produced by the webs are removed and the carbons pointed, when they are ready for the furnace. By another process the points are formed in the molds.

It will be apparent from this brief statement of the method of making carbon points that it is exceedingly primitive and materially defective in several important particulars. In the first place the entire process, from the time the carbon is placed in the scales till a marketable article is produced, except in the matter of pressing, is performed by manual labor. No successful attempt, as far as I am aware, has heretofore been made to introduce mechanical appliances to take the place of human hands in any of the steps above enumerated, with the trifling exceptions herein acknowledged. Now, when it is remembered that carbon-manufacture is carried on on a large scale, and involves the employing of hundreds of men in a single factory, the expensiveness of the present system will be appreciated; but the old process is objectable apart from the matter of cost.

First. It is impossible to distribute the material equally to all parts of the molds by pouring it directly from the scales, as is the common practice, for the reason that the material becomes more or less packed in the center, where it is emptied, while it is light at the sides and ends, to which it is afterward spread, thus producing carbons of unequal density in themselves and of unequal weight compared with each other.

Secondly. By the old method, the removal of the carbons from the mold while warm is objectionable, because the work can scarcely be done without inflicting more or less injury. The practice is to lift the carbons bodily up at one end and while in that position to introduce a thin metal plate, on which they are removed to the cooling-table, where the sheets or forms are placed one upon the other; but being warm, and hence soft and flexible, they are exceedingly liable to become bent, and therefore damaged, if not rendered worthless, by this change. Indeed, one of the principal objects in placing one layer of carbons upon another after removing them from the mold is to take out the crooks and bends produced by handling at this time; but this method of straightening is only partially successful, and the result is that many carbons are thus irreparably injured.

Thirdly. The web being broken by striking it with a metal plate, as above indicated, leaves a ragged edge or seam, which has to be removed by handling each carbon separately, and scraping the seam or grinding it down by means of an emery-wheel—a process that at best is very slow, and results in frequent breaking of the carbons. This process is varied by forcing the carbon through an annular steel cutter; but the cutter does not wholly remove the seams, while it also breaks a number of points.

Fourthly. The method of pointing carbons by grinding on an emery-wheel is slow and tedious, requiring much care to get the point exactly in the center. The exception to this method is to form the point on the carbon in the mold. Altogether the loss of carbons by bending, breaking, and other fatal injuries amounts, in the best-regulated establishments, to fully twenty-five per cent. of the whole number originally placed in the molds, with a corresponding incidental loss of time and labor expended in their manufacture.

By my process these several objections are almost wholly, if not entirely, obviated, and new steps are introduced and mechanism employed whereby the manufacture of carbons is greatly simplified, cheapened, and improved.

Primarily, the invention consists in improvements in the process of making carbons, and, secondly, in substituting machinery for hand-work in carrying the process into effect.

Figure 9:
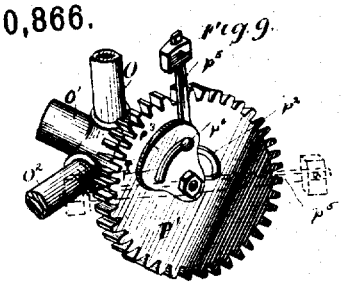
Figure 10:
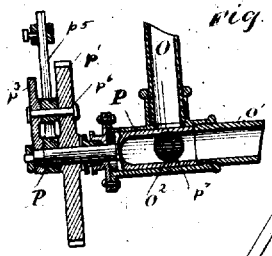
Figure 3:
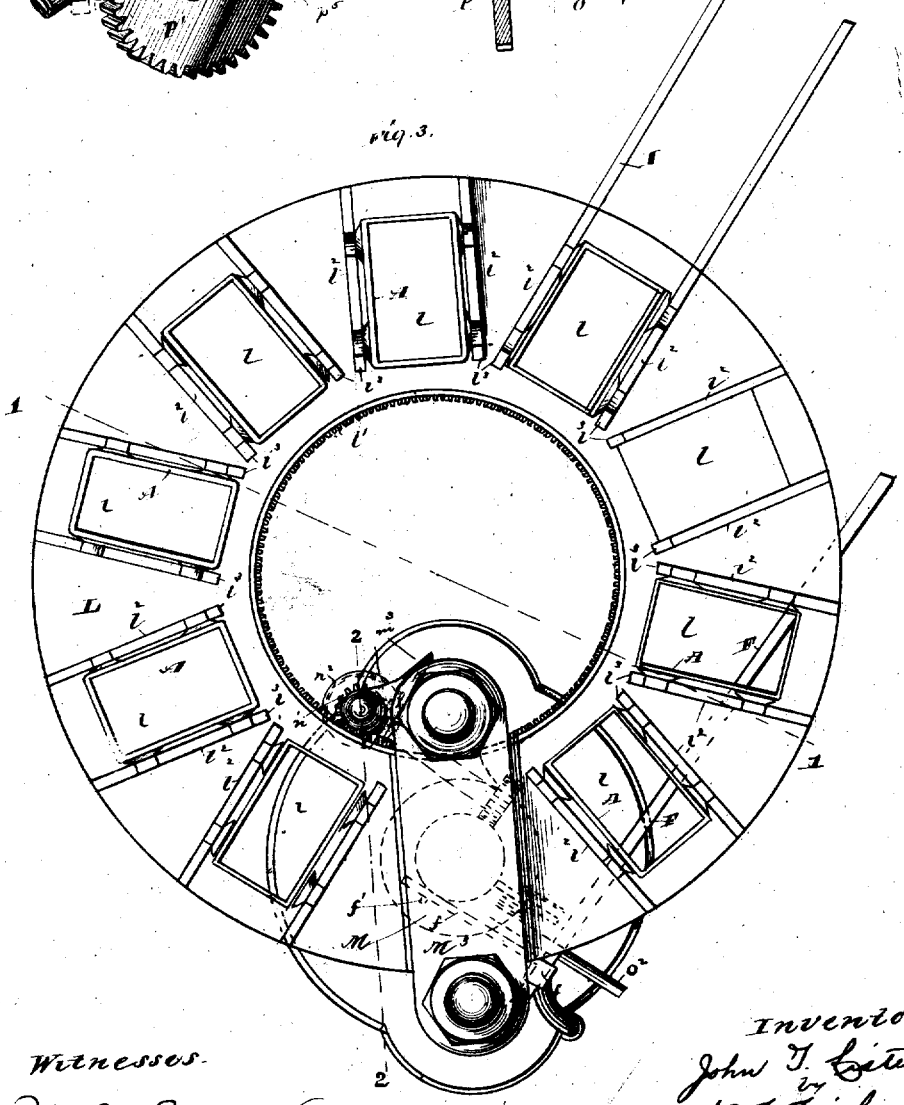
Figure 4:
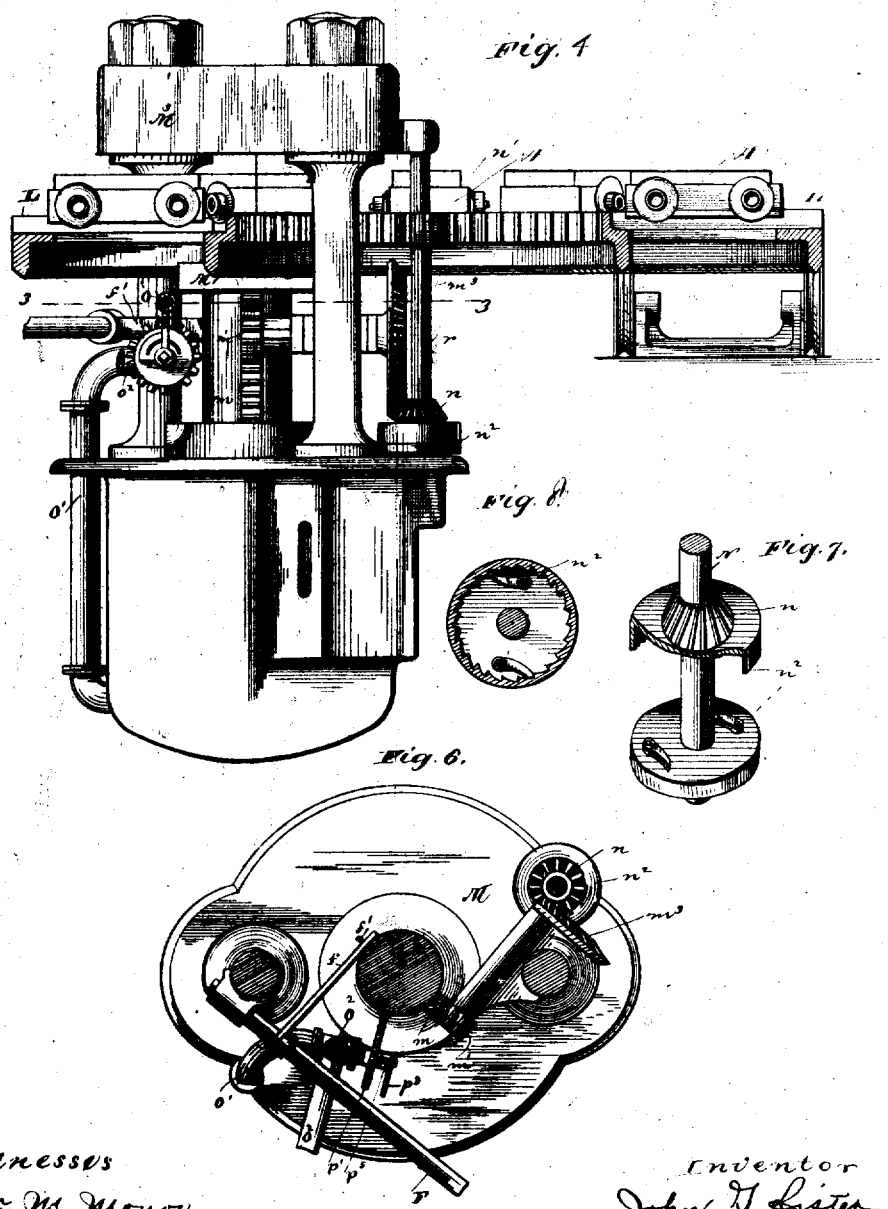
Figure 5:
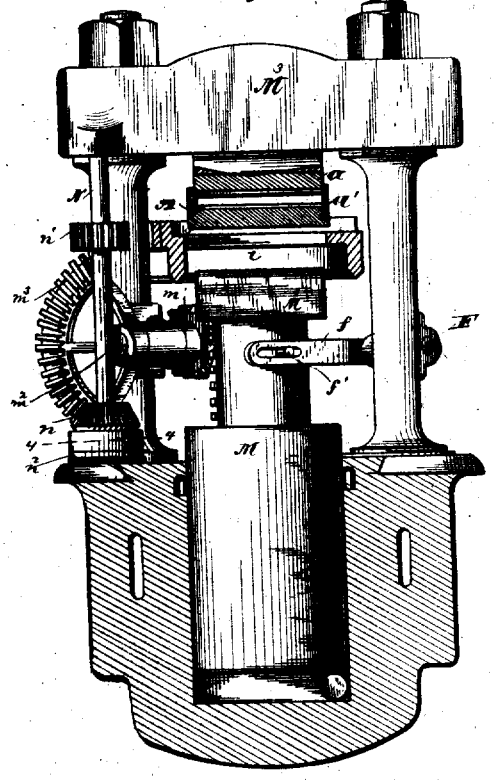
Figure 11:
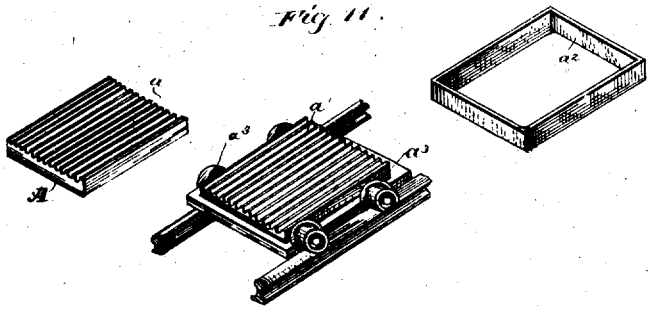
Figure 19:
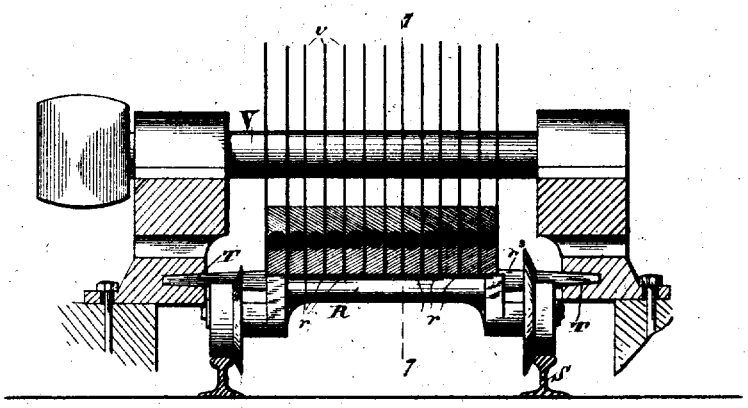
Figure 18:
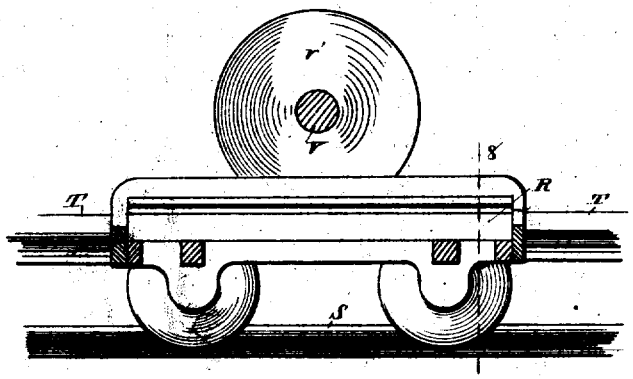
Figure 17:
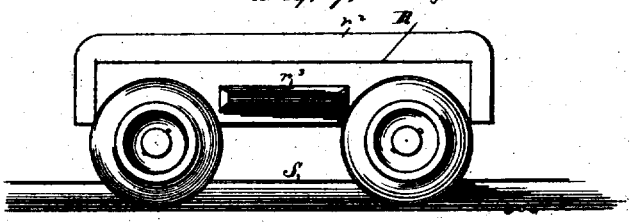

In the drawings, Figure 1 is a plan view of the carbon apparatus in its entirety, except the pointing mechanism. Fig. 2 is a side elevation of the same. Fig. 3 is an enlarged plan view of the revolving table, showing the molds in position on its surface and the hydraulic press beneath. Fig. 4 is an elevation in section on line 1 1, Fig. 3, showing the hydraulic press or ram and its connecting mechanism from the interior of the table. Fig. 5 is an elevation in section on line 2 2 of Fig. 3, showing the ram in position to operate on one of the molds. Fig. 6 is a horizontal section on line 3 3, Fig. 4. Fig. 7 is an isometric view of gear and ratchet for revolving the table carrying the molds. Fig. 8 is a sectional view of the ratchet on line 4 4, Fig. 5. Fig. 9 is a perspective view of the valve mechanism for controlling the movements of the ram through a rack on its side. Fig. 10 is a vertical section of the same. Fig. 11 shows a carbon-mold mounted on wheels with the cover and inclosing-frame detached. Fig. 12 is a side view of my automatic dust-feeding device. Fig. 13 is a vertical longitudinal section of the same. Fig. 14 is an enlarged transverse vertical section thereof on line 5 5, Fig. 12. Fig. 14ª is a detail of the sliding cut-offs. Fig. 15 is an end view of the reversing-car and mold in transferring position, taken on line 6 6, Fig. 2. Fig. 16 is an isometric view of a transferring-car and its slotted cover detached. Fig. 17 is a side elevation of the same with the cover on the car. Fig. 18 is a long longitudinal section on line 7 7, Fig. 19. Fig. 19 is a transverse section on line 8 8, Fig. 18, showing the cutters in position to sever the webs between the sections. Fig. 20 is an end elevation of the carbon pointing mechanism. Fig. 21 is a side elevation thereof, partly in section. Fig. 22 shows the matching faces of the cylinder and pointing-wheel, the shaft being broken and the wheels turned at right angles to the cylinder; and Fig. 23 is a section of a carbon drawn to a scale and showing the exact size of point required.

A, Fig. 11, represents the mold, consisting of upper and lower sections, *a a'*, and rectangular inclosing-frame, $a^2$, of the usual form, and supported on flanged wheels $a^3$.

B, Fig. 12, is a cylindrical receptacle for the carbon dust when suitably prepared to enter the mold, and has at its end a feed-spout, *b*. Within the receptacle B is a revolving screen, D, Fig. 14, which practically fills the interior of the receptacle, and is open at one end to allow the feed-spout to extend therein and deliver the dust toward the center of the screen. The screen is driven by power taken from any available source, a pulley on its shaft being provided for that purpose, and is designed to sift the dust into the conveying-trough *b'* below. This trough is occupied by conveyer or worm *d*, run by a pulley and belt from the screen-shaft. The screen and conveyer not only perform the functions here assigned to them, but serve to thoroughly mix the carbon material, if this has not been well done before. Perfect mixing of the dust and the pitch is highly essential to good work, and cannot be accomplished without much painstaking labor. Any defects in this particular will therefore be remedied by the screen and conveyer. From the conveyer the material drops into the delivery-spout E, Fig. 14, which has partitions *e*, corresponding to the carbon grooves in the molds A, and are designed to distribute exact and equal quantities of the material uniformly to each separate subdivision of the mold. Over the lower end of the delivery-spout is arranged a sleeve, E', adapted to slide up and down on the spout, and having partitions *e'*, corresponding to the partitions *e*, and serving to direct the material to its proper place in the mold. The movements of the sleeve E' are automatic and may be traced as follows: A shaft, F, supported in suitable bearings, is connected with the hydraulic ram by a rigid arm, *f*, Figs. 2 and 6, having a slot in its end and working over a pin, *f'*, on the ram. On the opposite end of the shaft is another rigid arm, $f^2$, pivotally connected with a yoke, $f^3$, the arms of which are attached to trunnions $f^4$ on the sides of sleeve E'. Transversely through the lower part of the sleeve E' and within its end walls is formed an opening which corresponds to and is continued in the grooves in the guides $e^2$, formed on the sleeve E'. In these guides and opening I place slides or cut-offs G, one of which enters from each end or side of the sleeve, and has its bearings in the guide and opening. The shaft F has a third rigid arm, $f^5$, Fig. 12, and on one of the trunnions $f^4$ is mounted a centrally-pivoted lever, $f^6$. A link or rod, $f^8$, connects arm $f^5$ with one arm of the pivoted lever, and links $f^7$ connect said lever with the ends *g* of the slide G.

With the mechanism thus completed, the operation of this part of the machine is as follows: Let us suppose the slides G to be withdrawn and the sleeve down around the box of the mold. The mold having stopped beneath the delivery-spout just long enough to be filled—and this time is graduated to correspond exactly with the movements of the turn-table and the molds that have gone before, as will be seen farther on—the shaft F operates at the same time in the downward movement of the ram to close the slides in against each other, so as to cut off the feed, and to raise the sleeve to permit the mold or car to pass from beneath. Then at the proper time another car is placed in position. The reverse movement of the shaft, caused by the upward movement of the ram, opens the slides till they have cleared the interior of the sleeve and lowers the sleeve about the mold, when the operation of filling is repeated. This action is alternated while the machine is in operation, one mold being filled while another is being pressed, and so on indefinitely. To prevent the escape of dust between the partitions $e$ and $e'$ where they overlap, deflectors $e^2$ are placed in the upper partitions. It should have been mentioned that by the method of feeding and distributing to the mold here adopted, and with the device for cutting off the supply, exactly an equal quantity of material is fed to each mold and no system of weighing or measuring other than is thus provided is required.

I, Fig. 3, represents a track the ends of which terminate at the turn-table. On this track the molds are carried from the filling device to the furnace, and then to the turn-table. This table conveys them through the press and delivers them on the other end of the track, when they pass again to the filling device, thus describing the circuit of the filling device, furnace, and press. The track and the turn-table together operate as the medium for conveying the mold to these three important stopping-places in the system.

The furnace K is formed with a passage-way, $k$, extending through it, and is built over or upon the track I, so that said track extends along the passage-way $k$ and through the furnace. The object of the furnace is to heat the carbon material in the mold and give it the requisite consistency preparatory to pressing. The form or size of the furnace or the manner of heating the same is not material, provided it is so constructed as to heat the carbon-dust to a sufficient degree while the mold remains in the furnace to be in condition in its turn for pressing.

L is the turn-table, supported upon suitable wheels or rollers, and so arranged with reference to the hydraulic press that it passes through the same between the cross-head thereof and the top of the piston or ram. In the operation of pressing, the head of the piston passes through the turn-table, for which provision is made by forming openings $l$ therein, at regular intervals, of a size corresponding to the size of the mold. These openings $l$ are flanked at either side on the top of the turn-table by short tracks $l^2$ $l^2$, adapted to be occupied by the molds and designed to center the molds laterally with reference to the openings $l$. Stops $l^3$ are fixed on the inner ends of the short tracks, against which the molds are run, and which determine the inner limit of the mold with reference to the openings $l$, so that by means of the tracks and the stops the molds are brought to exactly the right position over the openings $l$ to be lifted and pressed.

M represents the hydraulic press or ram, which may be of any well known pattern, the press itself forming no part of my invention; but the piston should be provided with a head, M, having a flat even surface of a size corresponding to the bottom of the mold, so that in pressing the carbons all parts of the molds will be subject to like and even pressure. This also necessitates an equal surface area in the cross-head M of the press, against which the mold is carried by the piston. On a side of the piston I secure a rack, $m$, Figs. 4 and 5, which gears with a pinion, $m'$, on shaft $m^2$. The shaft $m^2$ has a segmental gear, $m^3$, which meshes with a bevel-wheel, $n$, on a vertical shaft, N. On the upper end of this shaft is a pinion, $n'$, which engages with a gear, $l'$, on the interior of the turn-table L, and on its lower end, beneath the bevel-wheel, is a pawl-and-ratchet device, $n^2$. (Shown clearly in Figs. 7 and 8.) The design of this mechanism is to revolve the turn-table L, and its operation is as follows: Suppose a mold to have been carried in position for pressing, the ram moves up and performs its work, but without turning the shaft N, for the reason that the ratchet device keeps the bevel-wheel $n$ out of engagement with said shaft; but the ram or press having reached the limit of its upward movement, the induction-valve is reversed and the ram descends, which instantly starts the gearing in the opposite direction, throws the ratchets into engagement, and turns the shaft N and the turn table till the segmental gear $m^3$ is exhausted, when the turn-table stops. The segmental gear is intended to be of such range as is required to move up another car or mold to replace the one that has been pressed, and to leave it exactly in its proper position for pressing. This of course occurs while the ram is descending, and there is no movement of the table when it ascends and presses the next succeeding mold. In carrying out these operations it is desirable to have the hydraulic press automatic in its movements, so that the action will be regular and uniform and the presence of an attendant at the valves may be dispensed with. This I accomplish in the following manner:

Referring to Figs. 9 and 10, Sheet 3, O represents the induction pipe, O′ the pipe leading to the hydraulic cylinder, and $O^2$ the eduction or discharge pipe. Extending into the pipe O′ is a cylindrical valve, P, closely fitting said pipe and having a closed outer end and an open inner end and an annular opening at its side, which registers with both the induction and eduction pipes O and $O^2$ alternately. The valve P, Fig. 10, has a stem, $p$, projecting outward through packing in the head of pipe O', on which a gear-wheel, $p'$, is loosely mounted and adapted to turn independently of the said stem and valve. This wheel is provided with a curved slot, $p^2$, about midway between its axis and periphery. On the end of stem $p$ is rigidly secured a segmental plate, $p^3$, having a curved slot, $p^4$, corresponding to slot $p^2$ in the gear-wheel $p'$. Between the segmental plate and the gear-wheel is a weighted lever, $p^5$, pivoted loosely on valve-stem $p$, and provided near its center with a pin, $p^6$, which projects laterally on both sides of the lever into the slots $p^2$ and $p^4$ of the segment and gear wheel, respectively. The gear-wheel meshes with a short rack on the hydaulic piston, by which it is operated. It will be seen that the pipes O and $O^2$ are set at right angles to each other in the pipe O', so that they are but a quarter-turn apart. The valve P is therefore provided with an opening, $p^7$, in its side, which, when given a quarter-turn in either direction, will register with the induction and the eduction pipes alternately. I have therefore arranged my valve mechanism in such manner that the valve will be automatically thrown from one position to the other, according as the hydraulic piston is at the upper or the lower end of its stroke. This is accomplished by the weighted lever $p^5$ dropping right or left from a vertical position by its own gravity within the limits of the slot $p^2$ in the gear-wheel. Thus, for example, suppose the lever to have been raised from the left to a perpendicular position, as shown in Fig. 9. The instant it passes a perpendicular line it will fall to the right and carry the segmental plate $p^3$, which is rigid on the stem of valve P, with it, reversing the valve from communication with the eduction-pipe, as shown in Fig. 10, to the induction-pipe O. The instant this occurs the parts will be in the position shown in dotted lines on the right in Fig. 9, the slot in wheel $p'$ being behind the segmetal plate and exactly opposite the slot in said plate. Then the hydraulic piston, being at the bottom of its movement, at once begins to ascend, and in doing so carries the gear-wheel up on the right. This movement goes on till the lever, lifted by said wheel, is again brought to a perpendicular position, when it drops to the left and reverses the valve to the eduction-pipe. In this action one end of the pin $p^6$ of the lever is caught in the slot $p^2$, while the other moves freely in slot $p^4$ till it reaches the upper end thereof. Meantime the segmental plate and valve remain unmoved and the flow of fluid into the hydraulic cylinder goes on; but the instant the weighted lever passes the perpendicular position it falls to the left, one of its arms passing down in slot $p^2$, while the other carries the segmental plate with the valve P a quarter-turn to the left, when the change is completed.

After a mold has passed through the press it is carried around on the turn-table till it reaches the discharge end of the track I, where it is switched off and run down to the reversing-table Q, Fig. 2. This table practically forms a part of the track I, but involves a separate construction. As here shown, the table is provided with trunnions $q$, centrally at each end, which rest in bearings on cross-bars between the rails, and flanged guideways $q'$ along its track, which serve to engage the hubs on the wheels of the mold while the table, with the mold therein, is being reversed. A suitable spring-latch, $q^2$, at the side of the table holds it steady when a mold is being taken on or discharged. A mold being run in upon the table, the cover and rectangular inclosing-box are removed and the car R (shown in Fig. 16) placed thereon in reverse position. The two cars are then locked together by latches $q^3$ at the end, Fig. 15, when they are in readiness to be bodily inverted and lowered to track S. This track has a table corresponding in position to the table Q, and is immediately beneath it. It is supported on strong springs at its corners, which, when permitted to exert their force, carry the section or table up in contact with the inverted car R, which by the change is now on the under side. The latches $q^3$ are then released, and the car R is lowered to the end of the track S and switched off. The other car is restored to the track I and started around to be refilled with carbon-dust, and passes through the process hereinbefore described.

It will be observed that the car R has a platform provided with grooves $r$, corresponding exactly to those in the mold in size and number. In the change from the upper to the lower track the carbons are transferred to this car. Up to this time all the carbons remain in the sheet of form in which they were pressed, and are connected by webs. It is necessary now, before proceeding further with the manufacture, to divest the carbons of the webs and so dress them that no seams or ribs will be left along the side where the webs were connected. To accomplish this object, I form slots $r'$ between the grooves $r$ in the car R, which extend through the platform, and corresponding slots or cuts are made in the cover $r^2$ of the car. (Shown in Figs. 16 and 19.) This car is further provided with projections $r^3$ at its sides, which are adapted to enter guides T, placed at the side of the track, as shown in Fig. 19. Immediately above the center of the guides T is arranged a shaft, V, carrying a series of disks or cutters, $v$, designed to enter the slots in the car R and sever the carbon-webs. This shaft is driven by power taken from any available source, and the disks are preferably made with square edges and of such thickness that they will cut the web close to the carbon, thus leaving the carbon perfectly round after the web is removed.

The operation of this part of the machine is as follows: The car R, being loaded with carbons and provided with its slotted cover, is driven along the track through the guides T and beneath the disks $v$, which are revolving at a high speed. The guides serve to accurately center each car as it comes along and bring the slots in perfect alignment with the disks, and the car being driven with sufficient impetus to clear the guides and cutters the severing of the webs is the work of but an instant. It is of course understood that as yet the carbons are warm and the material easily worked. The carbons are now in readiness to be pointed. From the car R they are delivered on a table, W, Fig. 20, above which is arranged an endless apron, $w$, having fingers for carrying the carbons forward in straight lines, so as to be uniformly and properly fed to the pointing mechanism. This mechanism consists of a plain revolving cylinder, X, hung suitably upon a shaft, $x$, in bearings $x'$, and having arms $x^2$ flush with its ends, which arms are provided with openings $x^3$. The shaft and cylinder are rigidly connected and turned by pulley and belt. At the ends of the cylinder are wheels Y, having inwardly-beveled edges $y$ and arms $y'$, provided with perforations for the passage of bolts $y^2$, by which they are secured to the arms of the cylinder. The bearings $x'$ have short annular projections $x^4$, arranged eccentrically to the axis of the shaft $x$, as shown in Fig. 21, and the wheels Y are provided with hubs adapted to revolve on these projections. Inasmuch as the cylinder and wheels are designed to revolve together and are arranged on axes having different centers, it follows that there must be a movement between them equal to this difference, and this I have provided for in the enlarged openings $x^3$, in which the connecting-bolts are free to play. When united, the matching surfaces of the cylinder and wheels fit snugly upon each other at all points, and the bolts are screwed up to keep them in this relation, so that in operation they will act as if they were formed in a single piece. The cylinder and end wheels thus united and mounted revolve together over the concave bed Z, formed throughout with a surface corresponding exactly to the convexity of the cylinder and firmly supported beneath, so that there will be no variance in the space between the parts. This space is designed to be adjusted exactly to the thickness of the carbons, so that as the carbons are passed through between the cylinder and bed they will be in close contact with both surfaces and rotated or revolved by the cylinder from the time they enter on one side till they are discharged on the other.

Immediately beneath the wheels Y the bed is provided with inwardly-beveled ribs $z$, arranged transversely on the bed and matching the bevel of the wheel. These ribs are formed with uniform depth some distance right and left of their center, when they taper out toward the ends and terminate within the edge of the bed. It will be seen, also, that the wheels Y do not begin to bear against the ends of the carbon until the carbon has dropped into the bed and is engaged throughout its length by the surfaces of the bed and the cylinder. When this has occurred, both the wheels and the ribs come gradually into action at the same time and together form the points, as seen in Fig. 21. The carbon, being firmly held at all points between its ends and kept revolving, resists the inward pressure exerted by the beveled faces, and it follows that the surplus material is pressed out through the open space between the wheels and ribs. A knife, $z'$, at the upper edge of the bed serves to cut off this material before the carbon is released. The carbons being still warm and pliable, the rolling they receive between these surfaces is beneficial in other respects than aiding in forming the points. If by any reason the carbons have been crooked, the rolling will straighten them, and if in severing a web a seam was left the rolling will press it in and obliterate it. All the carbons after passing through the roller will be of the same length and perfectly round and smooth, and all will have their points formed exactly in the center. If desired, a light cohesive cover—such as rubber—may envelop the cylinder to aid in revolving the carbons. One or both ends of the carbon may be pointed and other obvious changes made in the mechanism without departing from the spirit and scope of my invention. After the carbons are delivered from the pointing mechanism they pass onto a cooling and hardening table, and by being kept in a rotary motion are made to cool uniformly on all sides, thus preventing the crooking which is liable to occur when they cool at one point more rapidly than another. If desired, the carbons may be exposed to a cold blast at this point, which will hasten the cooling. This being accomplished, the process of manufacture is completed and the carbons are ready to be baked.

The entire proceeding, from the time the molds are filled with the dust till the final step in the process is reached, occupies but comparatively few minutes, and there is no pause or break in the work, except such as is provided for in the general plan and needed to make the changes which the process involves. It will also be observed that the carbons are constantly in action, and at all times are either supported in or travel over surfaces which protect them their entire length and prevent the bending or warping to which they were liable under the old process.

Having thus described my invention, what I consider new, and desire to secure by Letters Patent, is—

1. The combination, in a carbon-machine, of a press, a furnace, and a mold, with a carrying-support for the mold between the press and furnace, whereby the mold is conveyed from the furnace to the press and back again to the furnace, substantially as set forth.

2. The combination, in a carbon-machine, of a mold, a furnace by which the mold is heated, a press, and a carrying-support for the mold between the furnace and the press, substantially as set forth.

3. In a carbon-machine, a press, a furnace, and a carrying-support for the mold between said parts, in combination with a mold and a device for filling the mold, substantially as set forth.

4. The combination, in a carbon-machine, of a device for filling the mold, a furnace in which the carbon-dust is heated in the mold, with said mold and a press, substantially as set forth.

5. In a carbon-machine, the combination of a press, a furnace for heating the carbon material in the mold preparatory to pressing, a mold for holding said material, and a carrying-support for the mold extending from the press to the furnace in a circuit, substantially as set forth.

6. In a carbon-machine, a press, a turn-table arranged to pass through the press and carry molds, in combination with a mold and a furnace to heat the mold and the material contained therein, substantially as set forth.

7. In a carbon-machine, the combination of a turn-table, a press in the line of the turn-table, a filling device for the molds, and a furnace in which the molds filled with material to be pressed are heated, substantially as set forth.

8. In combination, a press, a furnace for heating the carbon-dust in the mold preparatory to pressing, a stationary dust-feeding device, a carrying-support for the mold connecting the press, the furnace, and the filling device, and a mold, substantially as set forth.

9. In a carbon-machine, a turn-table, an outside track the ends of which terminate at the turn-table, and a furnace located in the line of the said track, in combination with a press, substantially as set forth.

10. A track, and a filling device, and a furnace arranged along said track, in combination with a turn-table and press, substantially as set forth.

11. In a carbon-machine, a hydraulic press, a turn-table arranged to pass through the press, an outside track formed in a circuit with the turn-table, a furnace, and a mold, substantially as set forth.

12. The method of separating carbons at their seams, which consists in removing the sheet or series of united carbons bodily from the mold before they have cooled and while in this state cutting the webs, substantially as set forth.

13. The method of severing carbon webs and pointing the carbons, consisting in removing the carbon sheet bodily from the mold while the carbons are warm to a table on which they are uniformly supported, and there cutting the webs, then, before the carbons become hard, forming the point on each carbon separately, substantially as set forth.

14. In a carbon-machine, a series of disks arranged on a shaft with equal spaces between them, in combination with a carbon-holder having grooves corresponding to the spaces between the disks, substantially as set forth. forth.

15. In a carbon-machine, a carbon-holder having grooves corresponding to the grooves in the mold and constructed to hold a sheet of uncut carbons, in combination with a series of cutters to sever the carbon webs, substantially as set forth.

16. In a carbon-machine, a filling device for the mold having a receptacle for the carbon-dust, a rotary feeder, a sifter, and an automatic shut-off to stop the flow of the dust, substantially as set forth.

17. In a carbon-machine, a filling device for the mold having a receptacle through which the carbon-dust is sifted, a feeder for the dust, a series of channels through which the carbon-dust enters the mold, and automatic mechanism whereby the flow of dust to the mold is controlled, substantially as set forth.

18. In a carbon-machine, a filling device for the mold, a screen, a worm to feed the dust, and channels through which the dust is fed to the mold, in combination with the mold and mechanism for automatically cutting off and turning on the flow of dust, substantially as set forth.

19. In a carbon-machine, a hydraulic press having a single water-passage leading below the piston therein, a reversing-valve in said passage, and mechanism connecting the press and the valve, whereby the valve is automatically reversed, substantially as set forth.

20. In a carbon-machine, a mold and a carrying-support therefor, in combination with a cutter to remove the carbon webs, and a transferring device to transfer the sheet of carbons from the mold to the cutter, substantially as set forth.

21. In a carbon-machine, a grooved transferring device for taking the sheet of carbons from the mold, in combination with a support for said device, and a series of circular cutters to sever the carbon webs, substantially as set forth.

22. In a carbon-machine, a bed having a beveled rib at its end, in combination with a cylinder and eccentric-wheel, substantially as set forth.

23. The process of manufacturing carbons, consisting, first, in pressing the carbons in molds, and then, before they become cold and hard, severing the webs and forming the points, substantially as set forth.

JOHN T. LISTER.

Witnesses:
H. T. FISHER,
WM. M. MONROE.